(12) United States Patent
Macias et al.

(10) Patent No.: US 9,025,535 B2
(45) Date of Patent: May 5, 2015

(54) APPLICATION-BASED BIASING OF FREQUENCY BANDS

(75) Inventors: John F. Macias, Antelope, CA (US); Derek H. Bao, Concord, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 762 days.

(21) Appl. No.: 12/485,268

(22) Filed: Jun. 16, 2009

(65) Prior Publication Data
US 2010/0316004 A1    Dec. 16, 2010

(51) Int. Cl.
*H04W 4/00* (2009.01)
*H04L 29/08* (2006.01)
*H04W 72/02* (2009.01)
*H04W 72/04* (2009.01)

(52) U.S. Cl.
CPC ............. *H04L 67/16* (2013.01); *H04W 4/00* (2013.01); *H04W 72/02* (2013.01); *H04W 72/0453* (2013.01)

(58) Field of Classification Search
CPC . H04L 5/0037–5/0041; H04L 5/0094–5/0098; H04L 5/003–5/0076; H04L 47/2433

USPC .................................................. 370/310–350
See application file for complete search history.

(56) References Cited

U.S. PATENT DOCUMENTS

| | | | |
|---|---|---|---|
| 5,608,727 | A | 3/1997 | Perreault et al. |
| 7,110,756 | B2 | 9/2006 | Diener |
| 7,123,592 | B2 * | 10/2006 | Geile et al. ................... 370/307 |
| 2006/0063543 | A1 | 3/2006 | Matoba et al. |
| 2006/0160551 | A1 * | 7/2006 | Matoba et al. ................ 455/509 |
| 2007/0002788 | A1 * | 1/2007 | Schmidt et al. ............... 370/328 |
| 2008/0220786 | A1 * | 9/2008 | Beacham ....................... 455/450 |
| 2010/0254380 | A1 * | 10/2010 | Clausen et al. ............... 370/389 |

* cited by examiner

*Primary Examiner* — Andrew Chriss
*Assistant Examiner* — Kenan Cehic (57) ABSTRACT

A method performed by a network device includes receiving a request for a service or an application and determining a type of the service or the application selecting a frequency band to provide the service or the application from among multiple frequency bands, where a selection of the frequency band is based on the type of the service or the application. The method further includes providing the service or the application on the selected frequency band.

20 Claims, 12 Drawing Sheets

APPLICATION-BASED BIASING OF FREQUENCY BANDS

BACKGROUND

Multiband access terminals or multiband user devices allow subscribers to access network services on different frequency bands. For example, in the United States, a Global System for Mobile Communications (GSM) network may operate in the 850 MHz and the 1900 MHz frequency bands, while in Europe, a GSM network may operate in the 900 MHz and the 1800 MHz frequency bands. Thus, a multiband access terminal that operates in the 850 MHz and the 1800 MHz frequency bands may allow a subscriber to access network services whether he or she is in the United States or in Europe.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "multiband," as used herein, refers to two or more frequency bands in which a multiband user device may access a wireless network. Thus, the term "multiband" may correspond to dual-band, tri-band, quad-band, etc.

The term "frequency band," as used herein, is intended to be broadly interpreted to include a frequency, a frequency range, and/or a frequency spectrum. The frequency band may be divided in various ways, such as, for example, channels, resource slots, etc. The frequency band may correspond to a carrier.

The term "frequency band biasing," as used herein, refers to the selection and/or utilization of frequency band versus another frequency band when both frequency bands are capable of being selected or utilized. As will be described, the biasing of one frequency band over another frequency band may be based on the type of service or the type of application being invoked.

The term "wireless network," as used herein, is intended to be broadly interpreted to include any type of wireless network, such as, for example, a cellular network or a mobile network (e.g., GSM, Long Term Evolution (LTE), Ultra Mobile Broadband (UMB), Code Division Multiple Access (CDMA), Evolved Universal Terrestrial Radio Access Network (EUTRAN), Personal Communications Service (PCS), Time Division Multiple Access (TDMA), third generation (3G), fourth generation (4G), ad hoc, High-Speed Packet Access (HSPA), and the like), and a non-cellular network (e.g., Wireless Fidelity (Wi-Fi), Worldwide Interoperability for Microwave Access (WiMax), and the like).

Embodiments described herein relate to an application-based biasing scheme in which the selection of a frequency band in which service is provided to a subscriber is based on the type of application invoked. Applications may be categorized depending on the type of application. For example, an application requiring low latency and/or that is a real-time application (e.g., telephony, Voice-over Internet Protocol (VoIP), video conferencing, video streaming, instant messaging (IM), Chat, and the like) may be considered a category of an application (e.g., a quality of service (QOS) application). In other instances, an application having a higher tolerance for latency and/or that is a non-real-time application (e.g., Web browsing, file transfer, e-mail, and the like) may be considered another category of an application (e.g., a best effort (BE) application). In this regard, an application may be categorized based on one or more metrics (e.g., latency tolerance, loss, jitter, bandwidth, etc.). Depending on the application and its corresponding category, the wireless network may bias the selection of one frequency band over another frequency band when multiple frequency bands are available.

Figure 1:
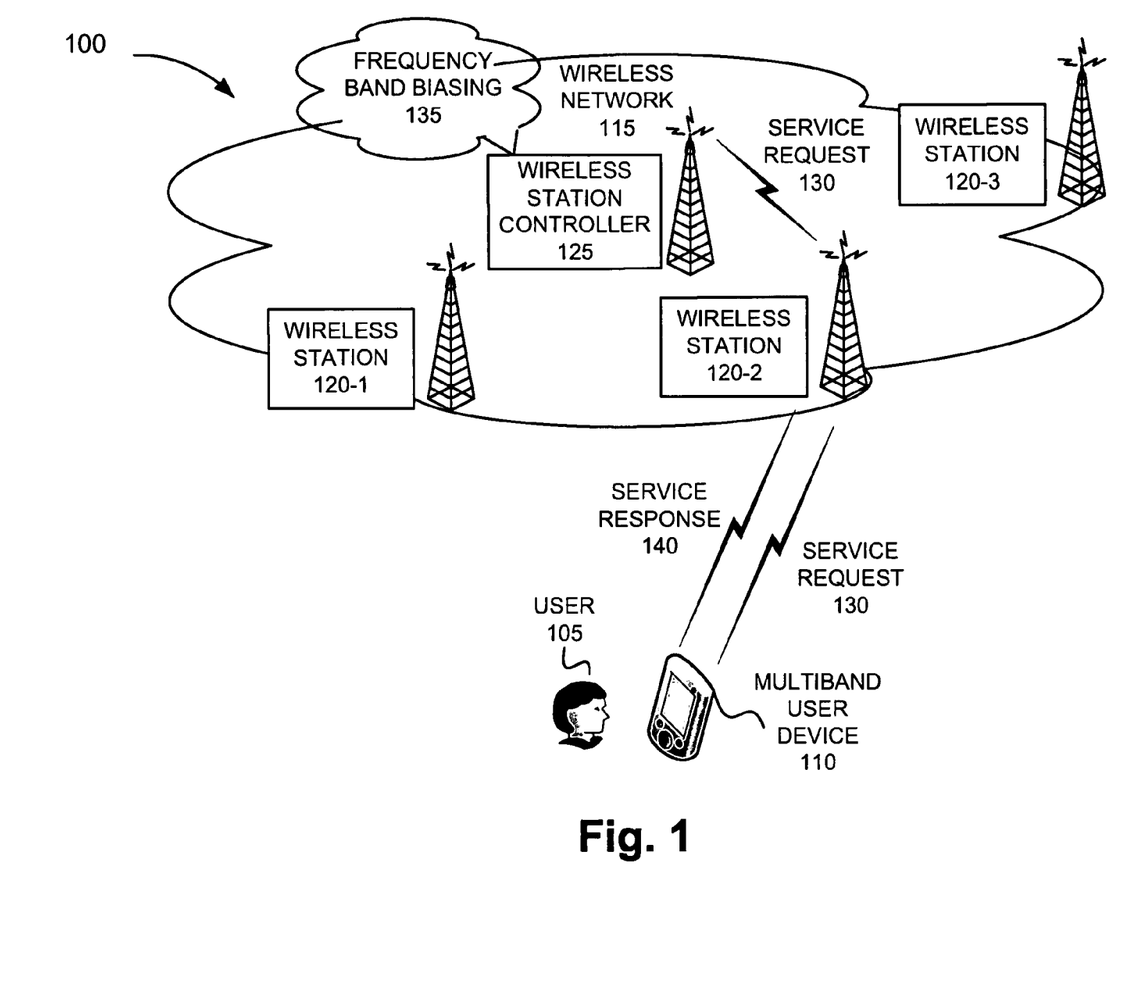
FIG. 1 is a diagram illustrating an exemplary environment in which devices, methods, and systems described herein may be implemented to provide application-based biasing for multiband user devices.

FIG. 1 is a diagram illustrating an exemplary environment in which devices, methods, and systems described herein may be implemented to provide application-based biasing for multiband user devices. As illustrated in FIG. 1, environment 100 may include a user 105, a multiband user device 110, and a wireless network 115. Wireless network 115 may include wireless stations 120-1 through 120-3 (generally referred to as wireless station 120), and a wireless station controller 125.

It will be appreciated that the number of devices, networks, and/or configuration in environment 100 is exemplary and provided for simplicity. In practice, environment 100 may include more, fewer, different, and/or differently arranged devices and/or network than those illustrated in FIG. 1. Also, some functions described as being performed by a particular device or network may be performed by a different device or network, or a combination thereof, in other implementations.

Multiband user device 110 may include a device having communication capability. Multiband user device 110 may correspond to a multiband device. Multiband user device 110 may include a portable, a mobile, or a handheld communication device. For example, multiband user device 110 may include a wireless telephone (e.g., a mobile phone, a cellular phone, a smart phone), a computational device (e.g., a handheld computer, a laptop), a personal digital assistant (PDA), a web-browsing device, a music playing device, a video playing device, a personal communication systems (PCS) device, a gaming device, a navigation device (e.g., a GPS-based device), a vehicle-based device, and/or some other type of communication device.

Wireless network 115 may include one or multiple wireless networks of any type. Wireless network 115 may operate according to any number of protocols, standards (e.g., GSM, CDMA, LTE, etc.), generations (second, third, fourth), etc.

Wireless station 120 may include a network device having communication capability. For example, wireless station 120 may correspond to a base station (BS), a base transceiver station (BTS), a Node B, an enhanced NodeB (eNodeB), some other type of network device (e.g., a repeater, a relay, etc.), or the like.

Wireless station controller 125 may include a network device having communication capability. For example, wireless station controller 125 may correspond to a BS controller, a radio network controller (RNC), a mobility management entity (MME), some other type of network device (e.g., a gateway, a serving General Packet Radio Service (GPRS) Support Node (SGSN), etc.), or the like.

In existing approaches, multiband user device 110 may have an equal probability of being assigned to one frequency band versus another frequency band. In such instances, multiband user device 110 may unnecessarily retune from one frequency band to another frequency band based on a cross-band assignment. Additionally, the propagation properties associated with a particular frequency band may not be beneficial, given the type of application or service invoked.

According to an exemplary implementation, assume user 105 operates multiband user device 110 and invokes a service request 130. Service request 130 may correspond to a request to invoke or utilize a service or an application. Service request 130 may propagate towards wireless station controller 125 (via wireless station 120-2). Assume that wireless station controller 125 may provide multiple frequency bands (e.g., 850 MHz and 1900 MHz).

Wireless station controller 125 may determine the category of the application or the service based on service request 130. Depending on the determined category of the application or the service, wireless station controller 125 may provide for frequency band biasing 135 with respect to the frequency bands available. In one embodiment, when the application or service corresponds to a real-time application, wireless station controller 125 may select a lower frequency band (e.g., 850 MHz) to provide for the requested service, since the lower frequency band has better propagation properties (e.g., distance, penetration through buildings, etc.) than a higher frequency band (e.g., 1900 MHz). Conversely, when the application or service corresponds to a non-real-time application, wireless station controller 125 may select a higher frequency band (e.g., 1900 MHz). Wireless station controller 125 may provide a service response 140 to multiband user device 110 via wireless station 120. The service or the application invoked may be provided to multiband user device 110 on the appropriate frequency band selected by wireless station controller 125.

As a result of the foregoing, the biasing of frequency bands at which services or applications are provided may influence performance and application functionality. Additionally, multiband user device 110 may not unnecessarily retune from one frequency band to another frequency band based on a cross-band assignment. Since embodiments and implementations have been broadly described, variations to the above embodiments and implementations will be discussed further below.

Figure 2:
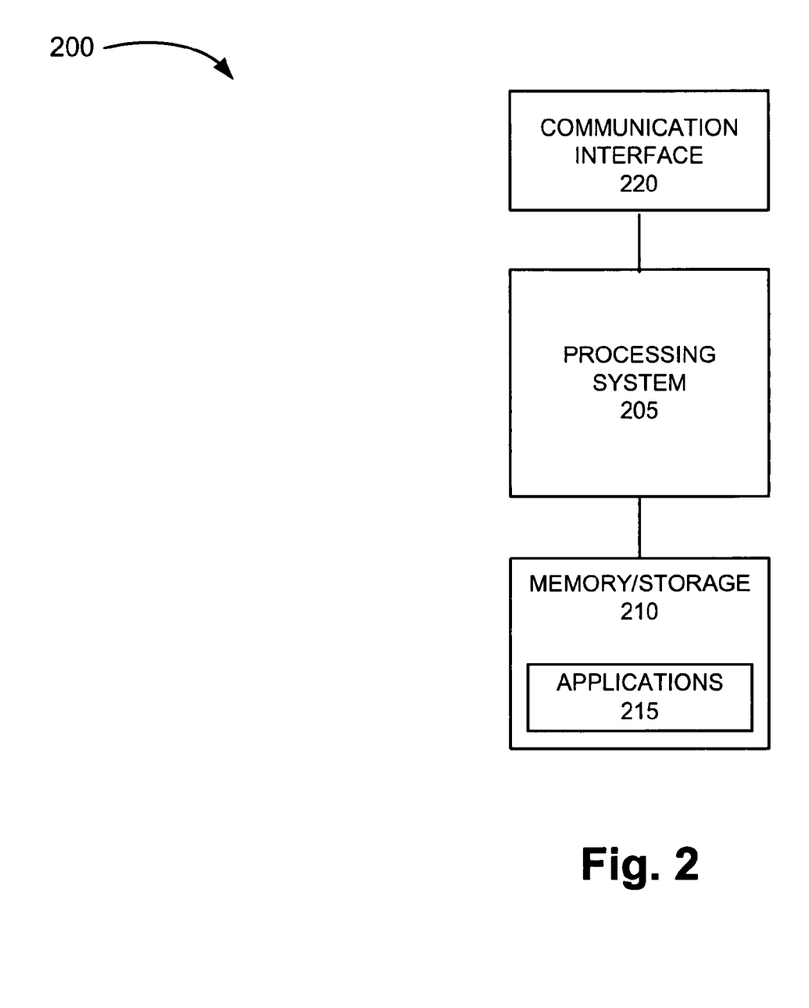
FIG. 2 is a diagram illustrating exemplary components of a device that may correspond to one or more of the devices depicted in the exemplary environment of FIG. 1.

FIG. 2 is a diagram illustrating exemplary components of a device that may correspond to one or more of the devices depicted in FIG. 1. For example, device 200 may correspond to wireless station controller 125 and other devices (e.g., multiband user device 110, wireless station 120). As illustrated, device 200 may include a processing system 205, a memory/storage 210 that includes applications 215, and a communication interface 220. In other embodiments, device 200 may include fewer, additional, and/or different components, or a different arrangement of components than those illustrated in FIG. 2 and described herein.

Processing system 205 may include one or more processors, microprocessors, data processors, co-processors, network processors, application specific integrated circuits (ASICs), controllers, programmable logic devices, chipsets, field programmable gate arrays (FPGAs), or some other component that may interpret and/or execute instructions and/or data. Processing system 205 may control the overall operation, or a portion thereof, of device 200, based on, for example, an operating system and/or various applications (e.g., applications 215).

Memory/storage 210 may include memory and/or secondary storage. For example, memory/storage 210 may include a random access memory (RAM), a dynamic random access memory (DRAM), a read only memory (ROM), a programmable read only memory (PROM), a flash memory, and/or some other type of memory. Memory/storage 210 may include a hard disk (e.g., a magnetic disk, an optical disk, a magneto-optic disk, a solid state disk, etc.) or some other type of computer-readable medium, along with a corresponding drive. The term "computer-readable medium" is intended to be broadly interpreted to include a memory, a secondary storage, a compact disc (CD), a digital versatile disc (DVD), or the like. The computer-readable medium may be implemented in a single device, in multiple devices, in a centralized manner, or in a distributed manner.

Memory/storage 210 may store data, application(s), and/or instructions related to the operation of device 200. For example, memory/storage 210 may include applications 215 that provide for application-based biasing of frequency bands based on a service or application invoked.

Communication interface 220 may permit device 200 to communicate with other devices, networks, and/or systems. For example, communication interface 220 may include an Ethernet interface, a radio interface, a microwave interface, or some other type of wireless and/or wired interface.

As described herein, device 200 may perform certain operations in response to processing system 205 executing software instructions contained in a computer-readable medium, such as memory/storage 210. The software instructions may be read into memory/storage 210 from another computer-readable medium or from another device via communication interface 220. The software instructions contained in memory/storage 210 may cause processing system 205 to perform processes described herein. Alternatively, hardwired circuitry may be used in place of or in combination with software instructions to implement processes described herein. Thus, implementations described herein are not limited to any specific combination of hardware circuitry and software.

Figure 3A:
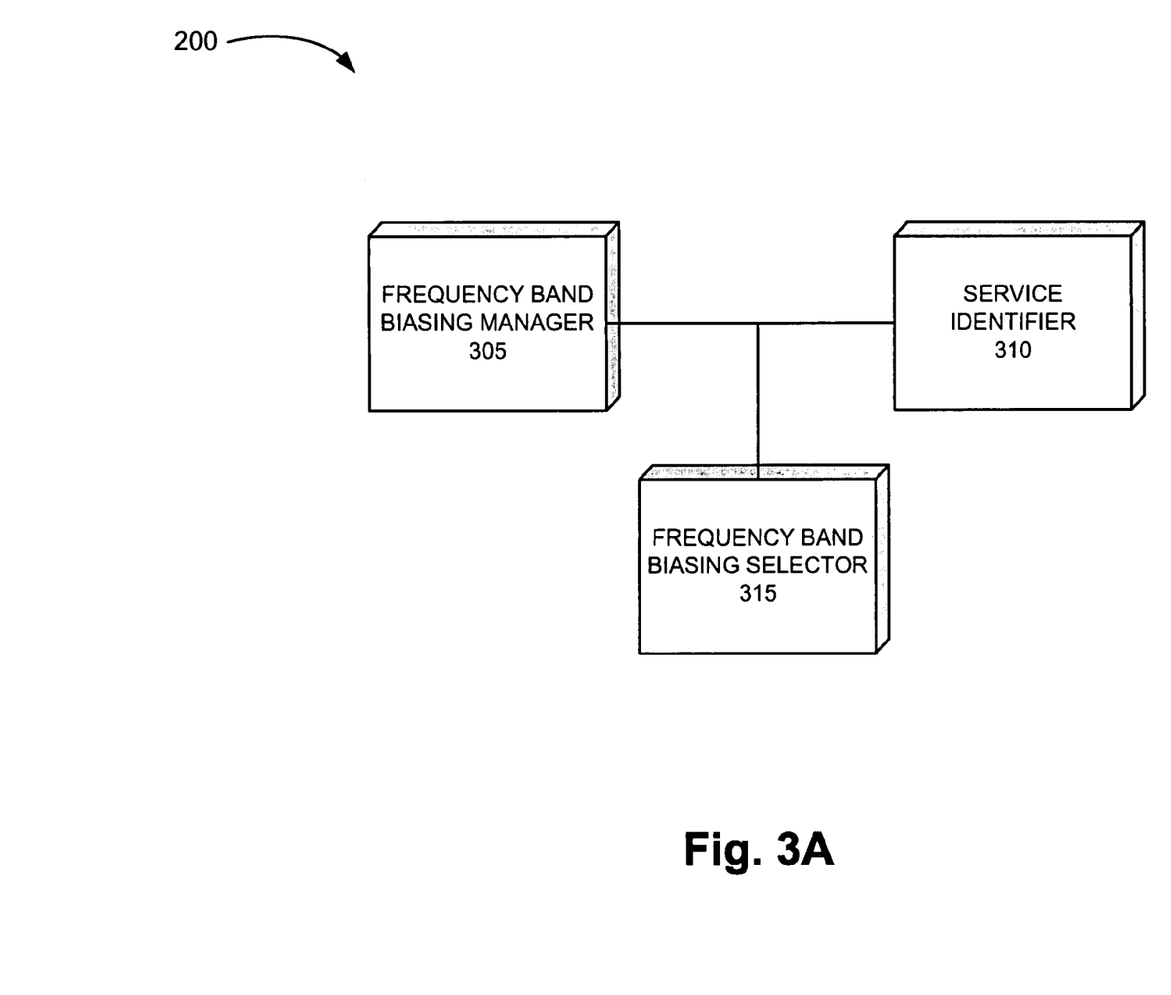
FIGS. 3A-3F are diagrams illustrating exemplary functional components of a wireless station controller depicted in FIG. 1.

FIGS. 3A-3F are diagrams illustrating exemplary functional components of wireless station controller 125. In other embodiments, one or more of the functions associated with wireless station controller 125 may be implemented wholly, or partially, in another device. For example, one or more functions associated with wireless station controller 125 may be implemented wholly, or partially, in wireless station 120. As illustrated in FIG. 3A, wireless station controller 125 may include a frequency band biasing manager (FBBM) 305, a service identifier 310, and a frequency band biasing selector (FBBS) 315. FBBM 305, service identifier 310, and FBBS 315 may be implemented in hardware (e.g., processing system 205) or a combination of hardware and software (e.g., applications 215).

As previously described, wireless station controller 125 may select a frequency band in which a service is provided to a subscriber based on the type of application invoked. Wireless station controller 125 may controller which of wireless stations 120 may be operating according to frequency band biasing. Wireless station controller 125 may determine the type of application invoked based on, for example, service request 135. Applications may be categorized depending on the type of application. For example, an application requiring low latency and/or that is a real-time application may be categorized as a QOS application. In other instances, an application having a higher tolerance for latency and/or that is a non-real-time application may be categorized as a BE application. Depending on the application and its corresponding category, the wireless station controller 125 may bias the selection of one frequency band over another frequency band when multiple frequency bands are available. For example, the bias of one frequency band over another frequency band may relate to the propagation properties of the frequency band compared to other frequency bands.

It will be appreciated that additional categories and/or sub-categories (e.g., sub-categories of real-time applications or sub-categories of non-real-time applications) for applications may be created based on various metrics. Correspondingly, frequency bands may be configured to match these categories and/or sub-categories.

Referring to FIG. 3A, FBBM 305 may control and/or manage the activation or the deactivation of the application-based frequency band biasing for each wireless station 120 that is controlled by wireless station controller 125. When wireless station controller 125 receives service request 130 via wireless station 120, FBBM 305 may determine whether wireless station 120 is activated or deactivated.

Service identifier 310 may identify a service or an application that is being invoked. For example, when FBBM 305 determines that wireless station 120 is activated, service identifier 310 may identify the service or the application that is being invoked.

FBBS 315 may select the frequency band in which a service or an application is provided to user 105. As will be described in greater detail below with respect to FIG. 3D, FBBS 315 may include a bias indicator 330, a frequency band tracker 335, and a frequency band assigner 340. Bias indicator 330 may provide the resource allocation with respect to each frequency band and category of service or application. For example, when service identifier 310 identifies the service or the application invoked. Wireless station controller 125 may identify the bias associated with the frequency band in which multiband user device 110. For example, an 850 MHz frequency band may have a bias such that 85% of the resources are allotted to QOS applications while 15% are allotted to BE applications. Bias indicator 330 may provide this information. Frequency band tracker 335 may track resource availability and/or utilization associated with frequency bands. Frequency band assigner 340 may assign the application or the service invoked to the appropriate frequency band. For example, frequency band assigner 340 may assign the appropriate frequency band based on the information associated with bias indicator 330 and frequency band tracker 335.

Figure 3B:
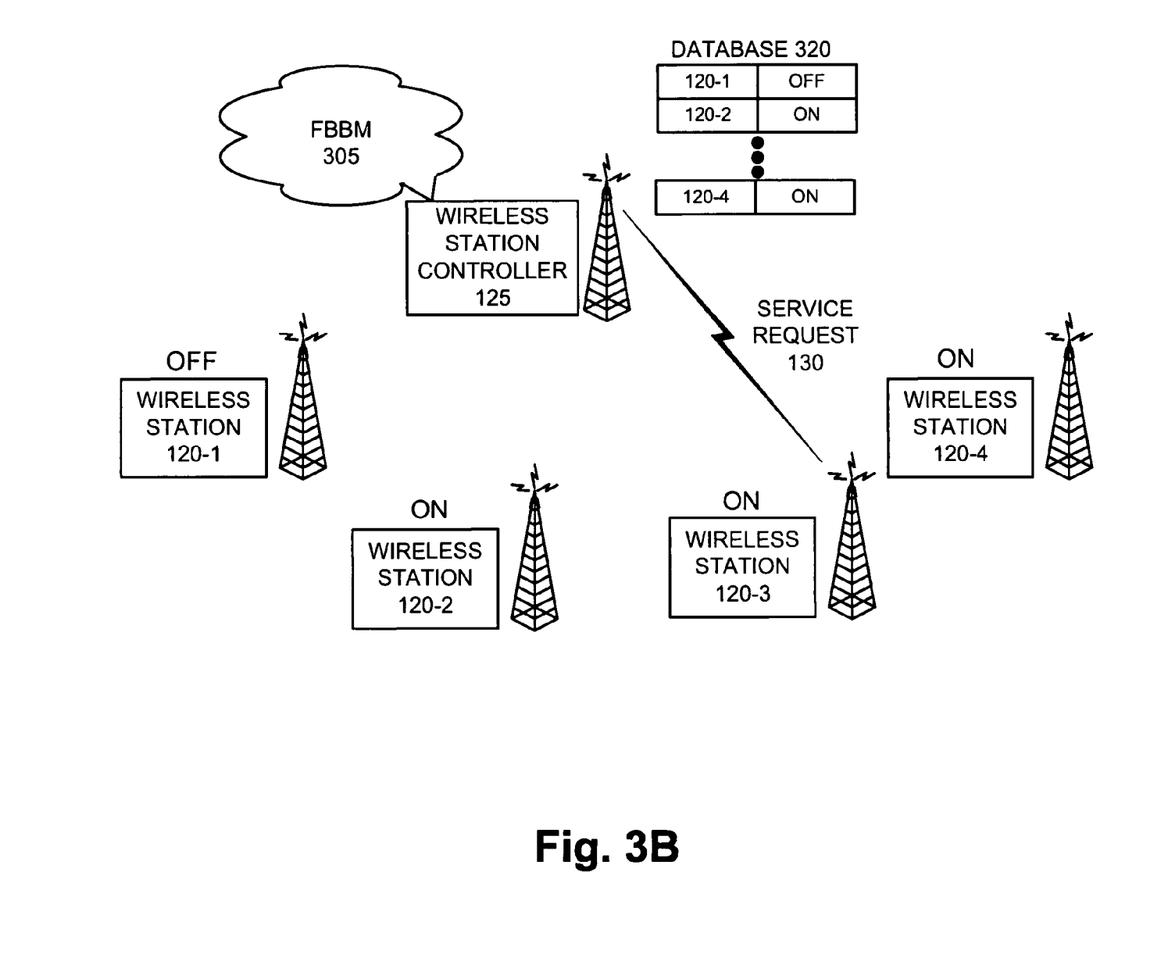

FIG. 3B is a diagram illustrating an exemplary frequency band biasing state associated with wireless stations 120. As illustrated, wireless stations 120 may be either in an "on" or an "active" state or in an "off" or a "deactivated" state. FBBM 305 may control whether wireless station 120 utilizes application-based frequency band biasing. In one implementation, FBBM 305 may manage a database 320 that stores the state (e.g., on or off) of each wireless station 120. For example, wireless station 120-1 may be in an "off" state and not operating in a biasing mode because wireless station 120-1 may correspond to an edge wireless station 120 that pushes traffic to another service provider. However, wireless stations 120-2 through 120-4 may be in "on" states and operating in biasing modes. In other implementations, FBBM 305 may include some other form of processing to determine the state of wireless station 120. For example, wireless station 120 may relay state information to wireless station controller 125. As previously described, when service request 130 is received from wireless station 120, FBBM 305 may determine whether wireless station 120 is in an active state or not.

Figure 3C:
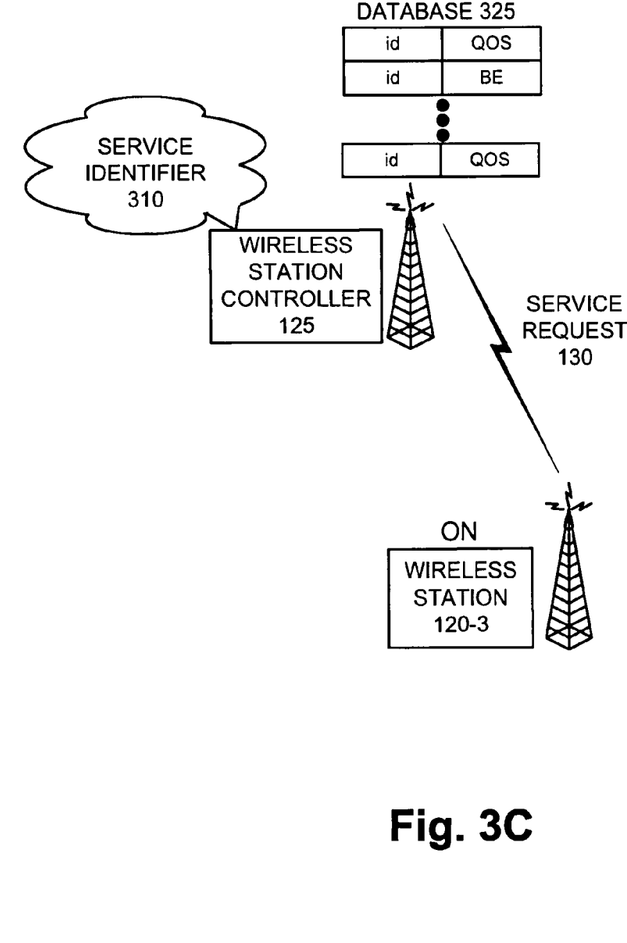

FIG. 3C is a diagram illustrating an exemplary process to identify a service or an application. As illustrated, service identifier 310 may receive service request 130. Service identifier 310 may identify the service or the application invoked based on service request 130. For example, service request 130 may include a packet identifier (PID) or a certain form of message bundling that permits service identifier 310 to determine whether the service or the application invoked corresponds to a particular category. In one implementation, service identifier 310 may include a database 325 that includes identifiers and corresponding service or application categories (e.g., QOS, BE, etc.).

Figure 3D:
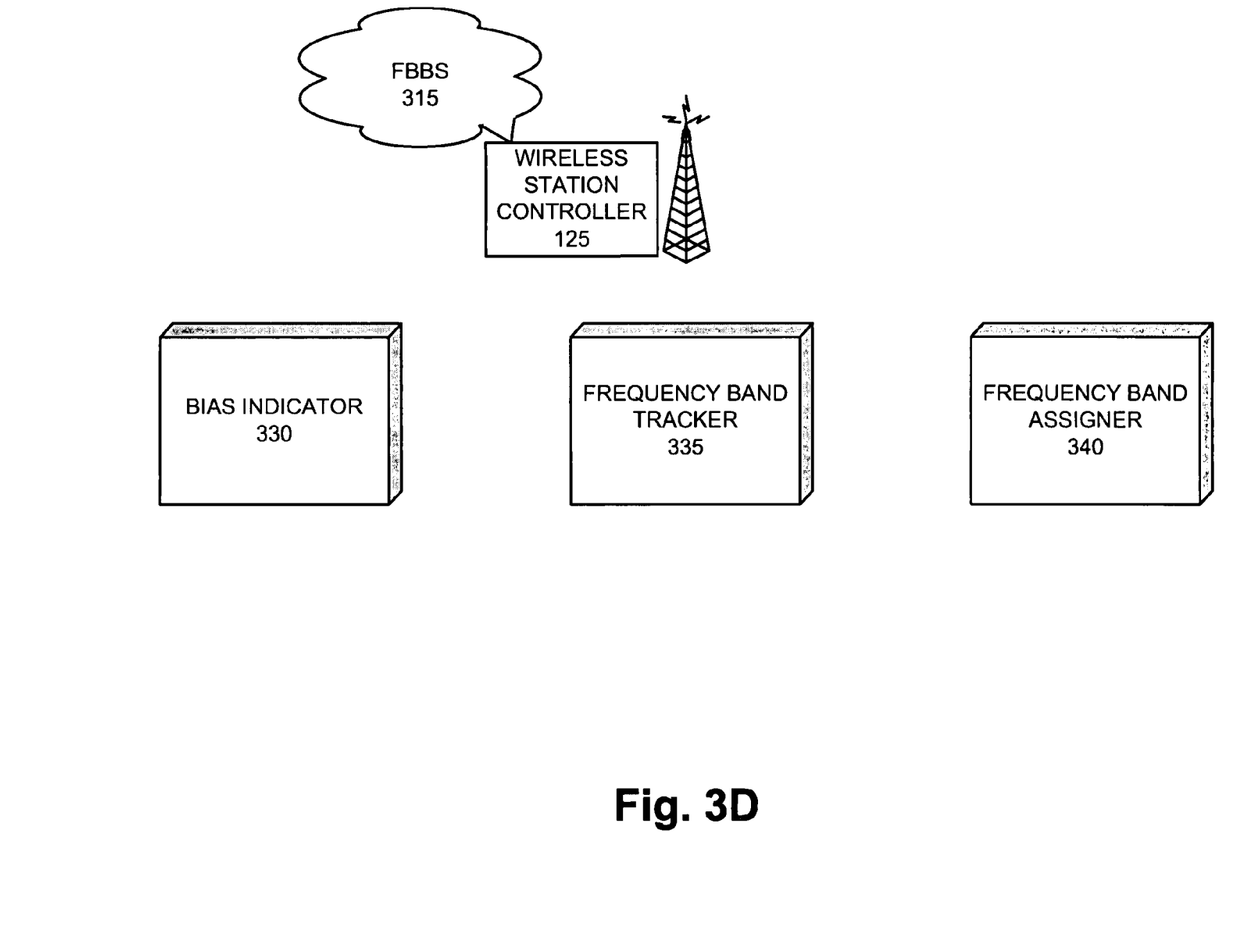

As previously described, FBBS 315 may select the frequency band in which a service or an application is provided to user 105. For example, when FBBS 305 indicates that wireless station 120 is active, and service identifier 310 identifies the type of service invoked, FBBS may select the appropriate frequency band based on application-based frequency band biasing. FBBS 315 may include bias indicator 330, frequency band tracker 335, and frequency band assigner 340, as illustrated in FIG. 3D.

Figure 3E:
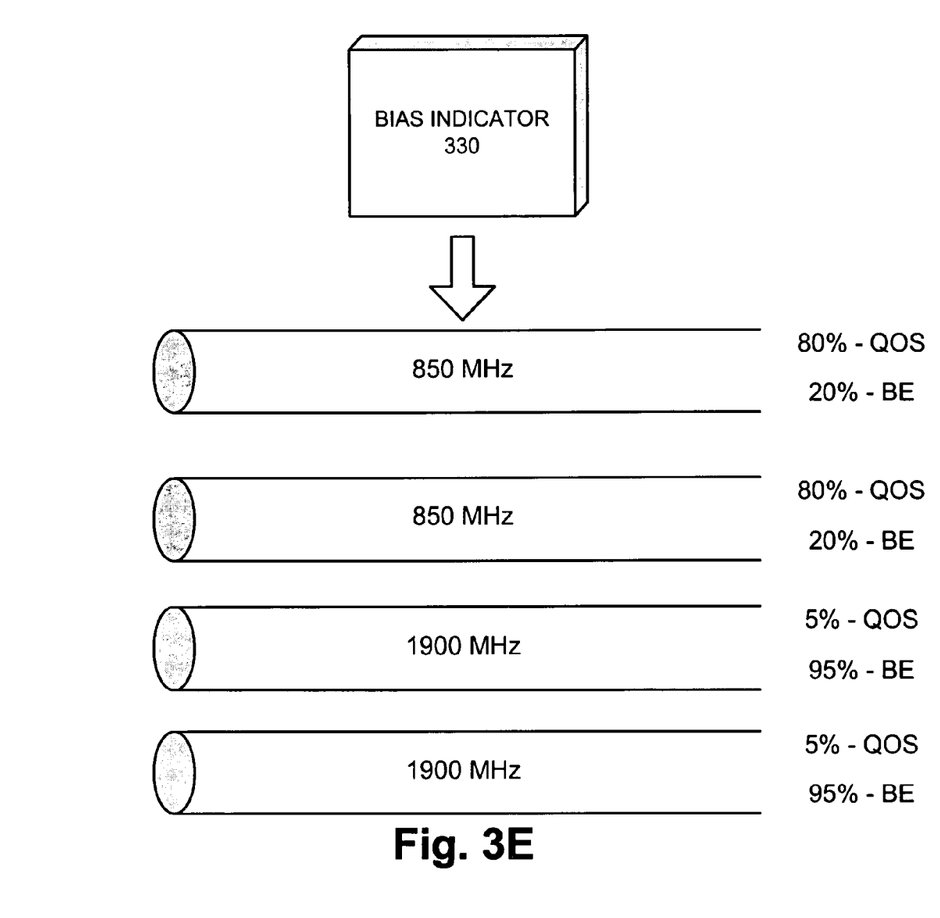

FIG. 3E illustrates bias indicator 330. As illustrated, bias indicator 330 may provide the resource allocation with respect to each frequency band and category of service or application. For example, assume that bias indicator 330 provides the resource allocation for two channels of the 850 MHz frequency band and two channels associated with the 1900 MHz frequency band. Bias indicator 330 may indicate that each channel associated with the 850 MHz frequency band is allocated such that 20% of the resources are for BE services, while 80% of the resources are for QOS services. Additionally, bias indicator 330 may indicate that each channel associated with the 1900 MHz frequency band is allocated such that 95% of the resources are for BE services, while 5% of the resources are allocated for QOS services.

The allocation or biasing of a frequency band may be static or dynamic. For example, the allocation or the biasing of a frequency band may be dynamically adjusted based on network state information (e.g., number of sessions, type of sessions per frequency band, etc.). In other implementations, for example, the allocation or the biasing of a frequency band may be static based on historical network usage. It will be appreciated that 80% to 20% and 95% and 5% are exemplary, and other biasing ratios may be implemented.

Additionally, in one embodiment, all channels of a particular frequency band may have the same frequency band biasing (e.g., 80% and 20%). In other embodiments, one or more channels of a particular frequency band may have different frequency band biasing. For example, one channel has 80% and 20%, while another channel has 85% and 15%.

Figure 3F:
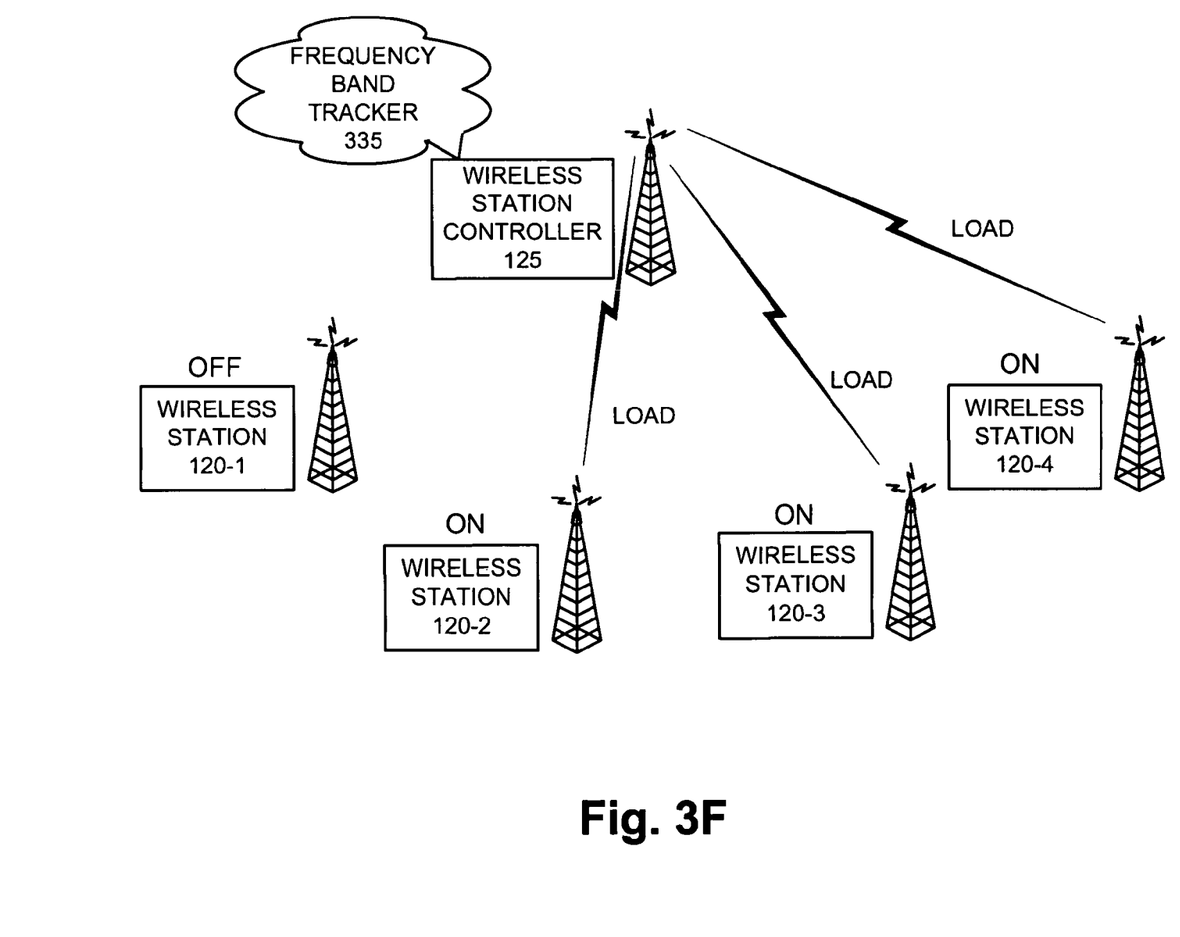

FIG. 3F is a diagram illustrating frequency band tracker 335. As illustrated, frequency band tracker 335 may obtain (e.g., from wireless stations 120) and/or have knowledge of the loads associated with each of wireless stations 120 and the respective frequency bands. For example, the loads may correspond to the type (e.g., QOS, BE) and/or number of sessions per frequency band. Frequency band tracker 335 may determine the load associated with wireless station 120 in which service request 130 was received. For example, frequency band tracker 335 may determine forward link utilization of wireless station 120.

Frequency band assigner 340 may assign the application or the service invoked to the appropriate frequency band. For example, frequency band assigner 340 may have the bias information associated with wireless station 120 from bias indicator 330 and the load associated with wireless station 120. In this way, frequency band assigner 340 may determine whether the bias of a frequency band is met or not. For example, if the bias indicator 330 indicates a bias of 80%, but the load is 70%, frequency band assigner 340 may determine that the bias is not met and may select the frequency band to provide the service or the application invoked.

Although FIGS. 3A-3F illustrate exemplary functional components of device 200, in other implementations, additional, fewer, or different functional components, and/or a different arrangement of functional components may be utilized other than those described and illustrated in FIGS. 3A-3F.

FIG. 4 is a diagram illustrating an exemplary process 400 for application-based biasing of frequency bands. In one implementation, process 400 may be performed by, for example, wireless station controller 125. In other implementations, process 400, or a portion thereof may be performed by other devices, such as, for example, wireless station 120.

Figure 4A:
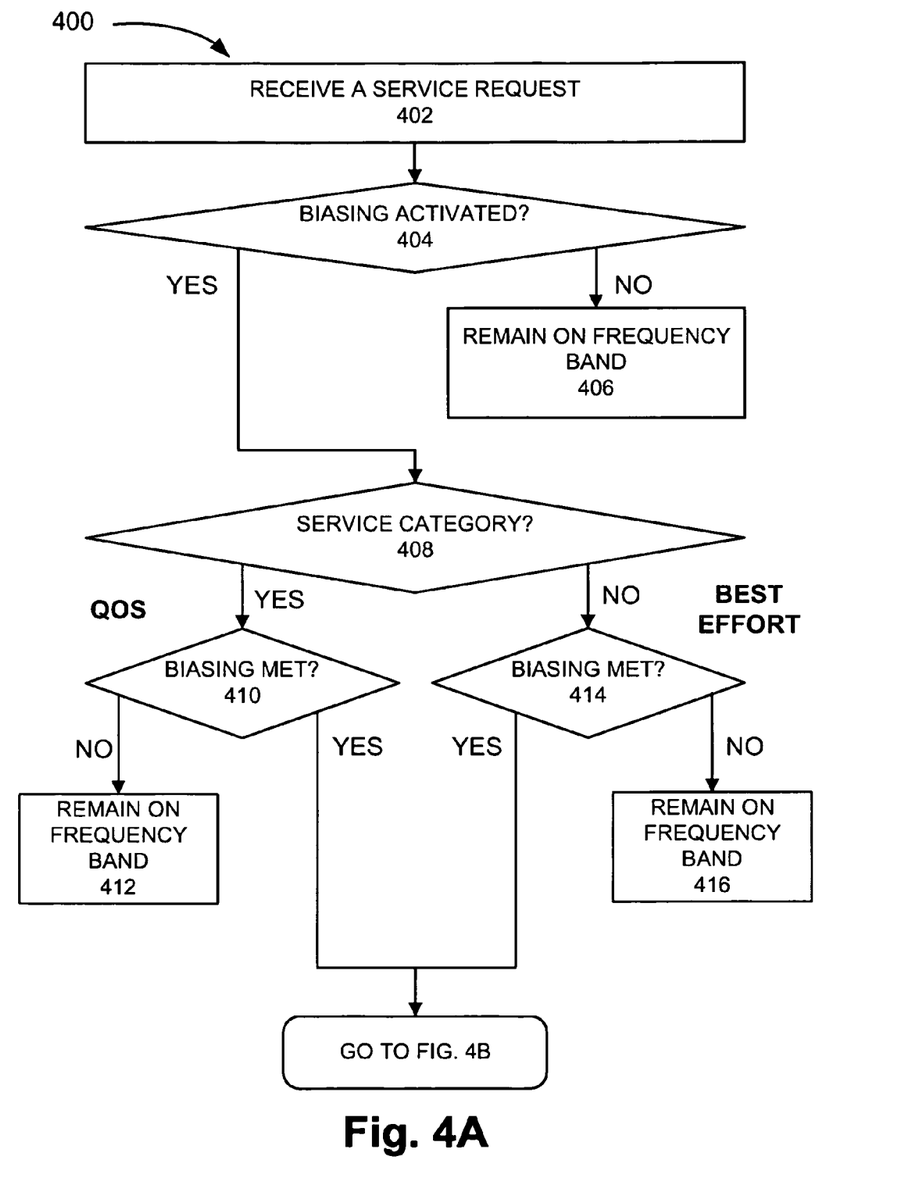
FIGS. 4A-4D are flow diagrams illustrating an exemplary process for application-based biasing of frequency bands.

Process 400 may begin with receiving a service request (block 402). For example, multiband user device 110 may access wireless network 115 and provide service request 130 to wireless network 115. In exemplary implementation, wireless station 120 may receive service request 130 and provide service request 130 to wireless station controller 125.

It may be determined whether the biasing of frequency bands is activated (block 404). For example, FBBM 305 of wireless station controller 125 may determine whether the biasing of frequency bands is activated for wireless station 120. In one implementation, FBBM 305 may refer to database 320 or some other type of data arrangement that indicates the activation state or the deactivation state of wireless station 120. In other implementations, FBBM 305 may include some other form of processing to determine the state of wireless station 120. For example, wireless station 120 may relay this information to wireless station controller 125.

When it is determined that the biasing of frequency bands is not activated (block 404—NO), the frequency band may remain the same (block 406). For example, multiband user device 110 may remain on the frequency band to which it accessed wireless network 115. Service response 140 may be provided to multiband user device 110 and user 105 may be provided access to the service or application invoked.

When it is determined that the biasing of frequency bands is activated (block 404—YES), a category of the service being invoked may be determined (block 408). For example, service identifier 310 of wireless station controller 125 may receive service request 130. Service identifier 310 may identify the service or the application invoked based on service request 130. For example, service request 130 may include a packet identifier (PID) or certain form of message bundling that permits service identifier 310 to determine whether the service or the application invoked corresponds to a particular category. In one implementation, service identifier 310 may include a database 325 that includes identifiers and corresponding service or application categories. For purposes of discussion, QOS and BE will correspond to the exemplary service categories. However, in other embodiments, the number and/or the type of categories may be different.

As illustrated, in block 408, where the service category may be one of two categories, block 408 may determine whether the service or application invoked is a QOS service or application.

When it is determined that the service category is QOS (block 408—YES), it may be determined whether the frequency band biasing is met (block 410). For example, FBBS 315 may determine the frequency bias on the frequency band (e.g., channel) in which the multiband user device 110 accessed wireless network 115. Bias indicator 330 may indicate the frequency band biasing of the channel associated with the frequency band. For example, the frequency band biasing of the channel may correspond to 80% of resources are allocated to QOS applications or services, while 20% of the resources on the channel are allocated to BE applications or services.

Frequency band tracker 335 of wireless station controller 125 may track the resource availability and/or the resource usage (e.g., load) associated with the frequency band (e.g., channel), with respect to wireless station 120. Based on information associated with bias indicator 330 and frequency band tracker 335, FBBS 315 may determine whether the frequency band biasing is met. For example, if the frequency band biasing corresponds to 80% for QOS applications or services, and the load of QOS services or applications for wireless station 120 is only 50%, FBBS 315 may determine that the frequency band biasing is not met. Conversely, when the load of QOS services or applications for wireless station 120 is approximately 80%, FBBS 315 may determine that the frequency band biasing is met.

When it is determined that the frequency band biasing is not met (block 410—NO), the frequency band may remain the same (block 412). For example, frequency band assigner 340 of wireless station controller 125 may assign the channel of the frequency band to which multiband user device 110 accessed wireless network 115 as the frequency band channel to provide the service or the application invoked.

When it is determined that the frequency band biasing is met (block 410—YES), process 400 continues to FIG. 4B, which will be described later.

Referring back to block 408, when it is determined that the service category is not QOS (block 408—NO), it may be determined whether the frequency band biasing is met (block 414). For example, FBBS 315 may determine the frequency bias on the frequency band (e.g., channel) in which the multiband user device 110 accessed wireless network 115. Bias indicator 330 may indicate the frequency band biasing of the channel associated with the frequency band. For example, the frequency band biasing may correspond to 80% of resources on the frequency band are allocated to QOS applications or services, while 20% of the resources on the frequency band are allocated to BE applications or services.

Frequency band tracker 335 of wireless station controller 125 may track the resource availability and/or the resource usage (e.g., load) associated with the channel of the frequency band, with respect to wireless station 120. Based on information associated with bias indicator 330 and frequency band tracker 335, FBBS 315 may determine whether the frequency band biasing is met. For example, if the frequency band biasing corresponds to 20% for QOS applications or services, and the load of BE services or applications for wireless station 120 is only 10%, FBBS 315 may determine that the frequency band biasing is not met. Conversely, when the load of BE services or applications for wireless station 120 is approximately 20%, FBBS 315 may determine that the frequency band biasing is met.

When it is determined that the frequency band biasing is not met (block 414—NO), the frequency band may remain the same (block 416). For example, frequency band assigner 340 of wireless station controller 125 may assign the channel of the frequency band to which multiband user device 110 accessed wireless network 115 as the frequency band channel to provide the service or the application invoked.

When it is determined that the frequency band biasing is met (block 414—YES), process 400 continues to FIG. 4B, which will be described later.

Figure 4B:
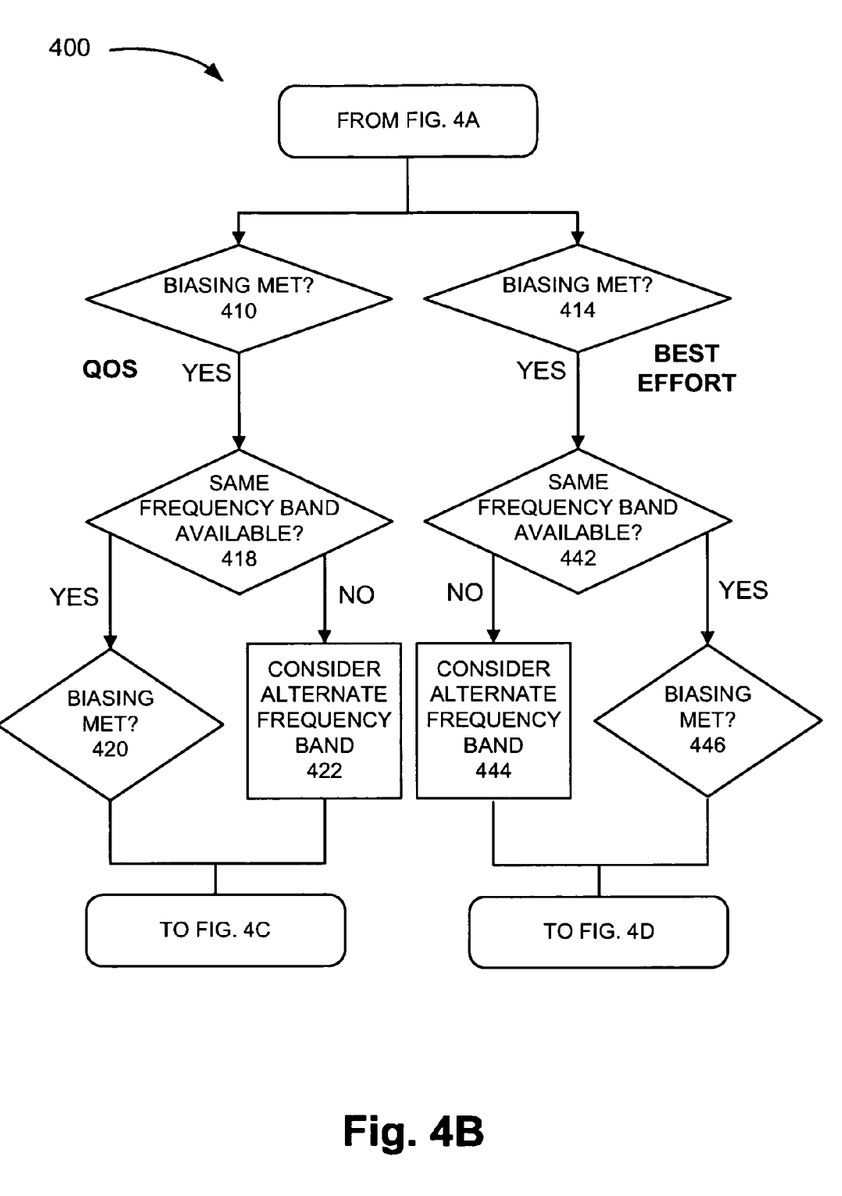

Referring to FIG. 4B, blocks (410—YES) and (414—YES) are illustrated. When it is determined that the frequency band biasing is met (block 410—YES), it may be determined whether the same frequency band is available (block 418). For example, assume that there exists more than one channel with respect to the 850 MHz band. FBBS 315 may determine whether the same frequency band in which multiband user device 110 accessed wireless network 115 is available.

When it is determined that the same frequency band is available (block 418—YES), it may be determined whether the frequency band biasing is met (block 420). As will be described below in reference to FIG. 4C, wireless station controller 125 may determine whether the frequency band bias is met.

When it is determined that the same frequency band is not available (block 418—NO), an alternate frequency band may be considered (block 422). As will be described below in reference to FIG. 4C, wireless station controller 125 may determine whether an alternate frequency band may be utilized.

Figure 4C:
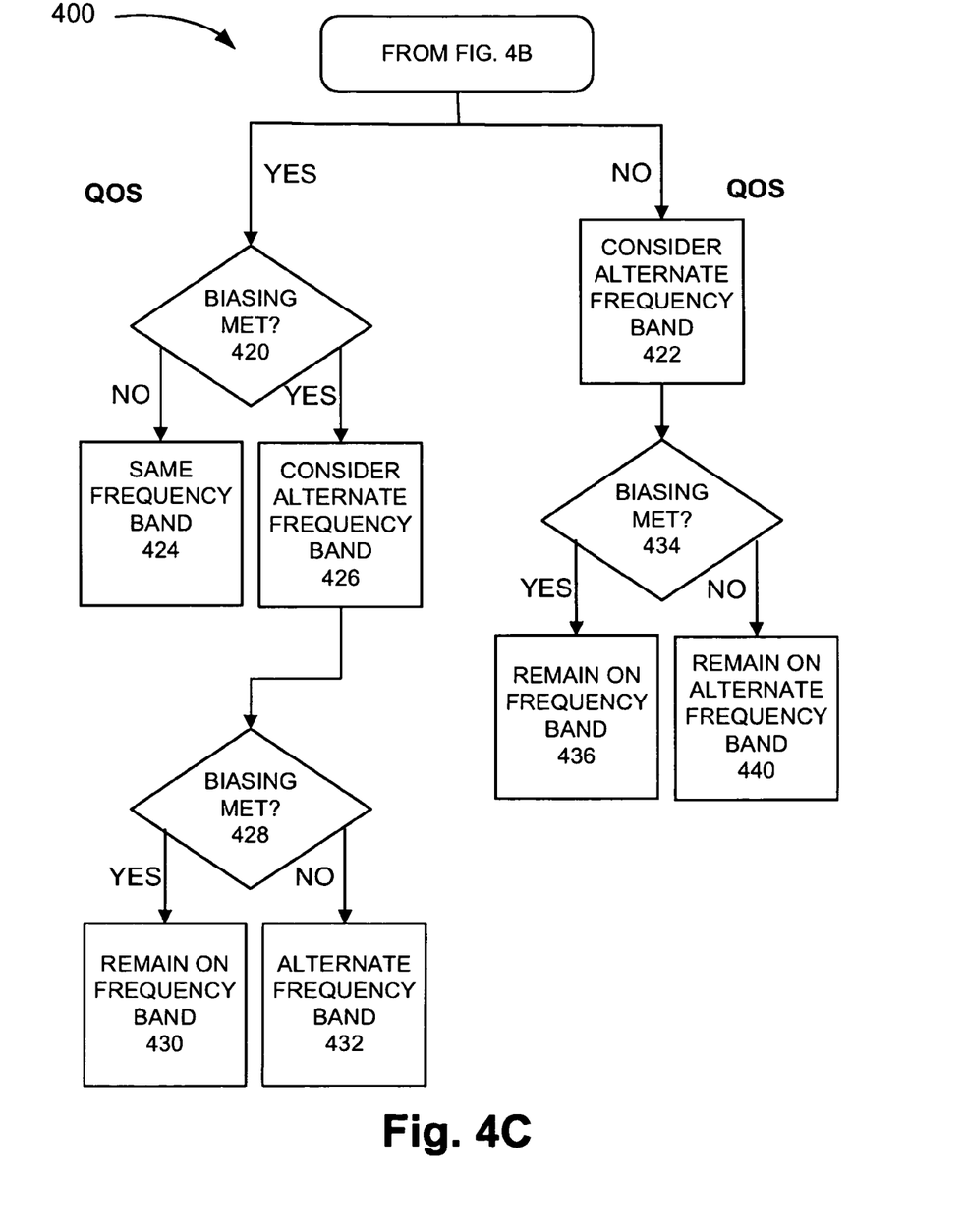

Referring to FIG. 4C, blocks 420 and 422 are illustrated. Referring to block 420, it may be determined whether the frequency band biasing is met. For example, as previously described, FBBS 315 may determine the frequency bias on the same frequency band, but a different channel, based on bias indicator 330. Frequency band tracker 335 may track the resource availability and/or the resource usage. Based on this information, FBBS 315 may determine whether the frequency band bias is met.

When it is determined that the frequency band biasing is not met (block 420—NO), the frequency band may remain the same (block 424). For example, frequency band assigner 340 of wireless station controller 125 may assign the same frequency band, but a different channel, to which multiband user device 110 accessed wireless network 115 as the frequency band channel to provide the service or the application invoked.

When it is determined that the frequency band biasing is met (block 420—YES), an alternate frequency band may be considered (block 426). For example, assume that an alternate frequency band (e.g., 1900 MHz) exists. FBBS 315 may consider the alternate frequency band. It will be appreciated that depending on the number of channels and/or the allocation of resources with respect to the same frequency band, process 400 may determine whether any channel or resource allocation on the same frequency band is available before considering the alternative frequency band.

It may be determined whether the frequency band biasing of the alternate frequency band is met (block 428). When it is determined that the frequency band biasing of the alternate frequency band is met (block 428—YES), the frequency band may remain the same (block 430). For example, frequency band assigner 340 may assign the channel of the frequency band to which multiband user device 110 accessed wireless network 115 as the frequency band channel to provide the service or the application invoked.

When it is determined that the frequency band biasing of the alternate frequency band is not met (block 428—NO), the alternate frequency band may be utilized (block 432). For example, frequency band assigner 340 may assign a channel associated with the alternate frequency band as the frequency band channel to provide the service or the application invoked.

Referring to FIG. 4C, the processes associated with blocks, 422, 434, 436 and 440 would be analogous to those discussed with respect to blocks 426, 428, 430, and 432. That is, as illustrated in FIG. 4B, when it is determined that the same frequency band is not available (block 418—NO), an alternate frequency band may be considered (block 422) (FIG. 4C). Process 400 may continue in blocks 434, 436 and 440, in a manner analogous to blocks 428, 430, and 432.

Figure 4D:
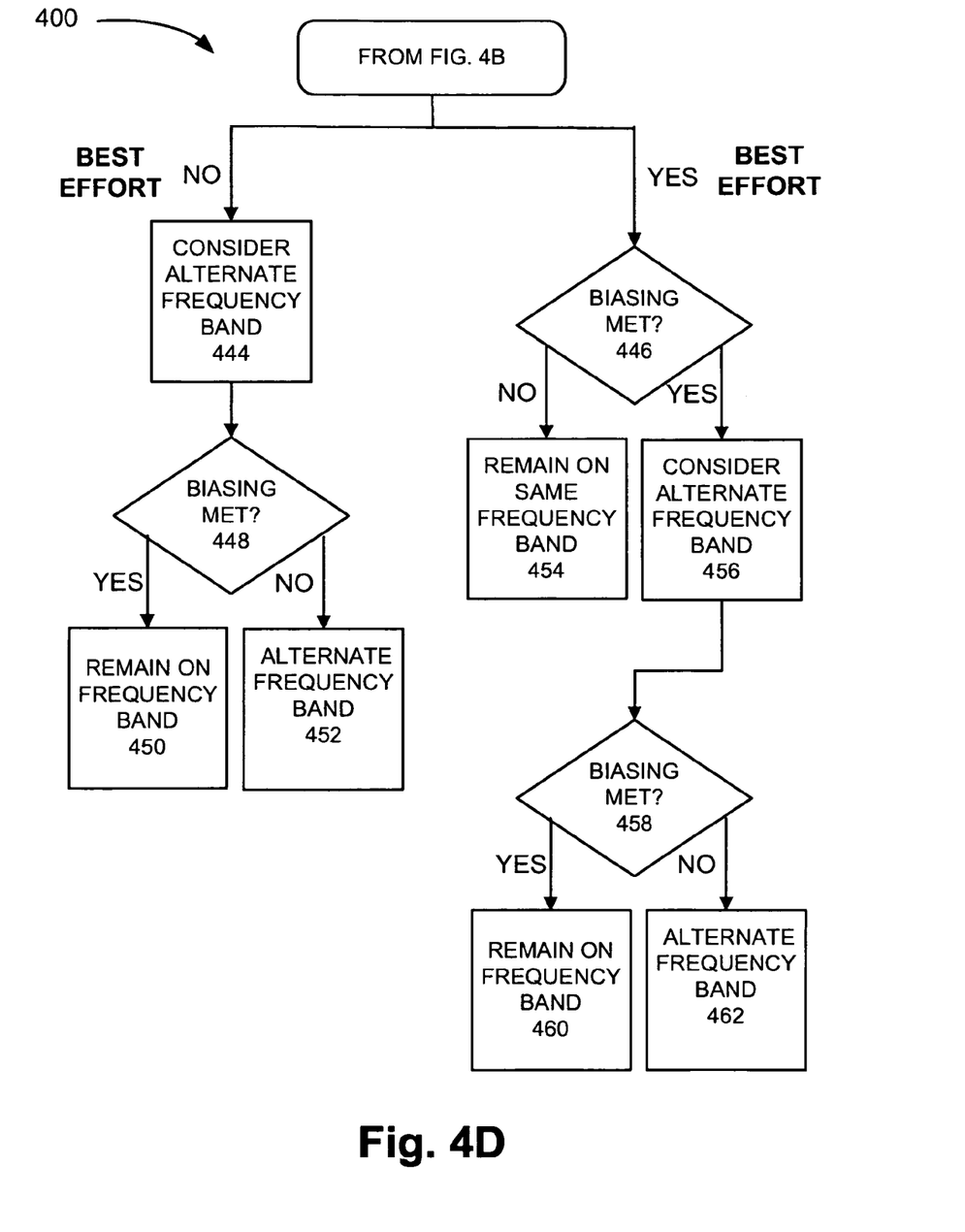

Referring back to FIG. 4B, blocks 444 and 446 may continue to FIG. 4D. As illustrated in FIG. 4D, an alternate frequency band may be considered (block 444). For example, assume that an alternate frequency band (e.g., 1900 MHz) exists. FBBS 315 may consider the alternate frequency band.

It may be determined whether the frequency band biasing of the alternate frequency band is met (block 448). When it is determined that the frequency band biasing of the alternate frequency band is met (block 448—YES), the frequency band may remain the same (block 430). For example, frequency band assigner 340 may assign the channel of the frequency band to which multiband user device 110 accessed wireless network 115 as the frequency band channel to provide the service or the application invoked.

When it is determined that the frequency band biasing of the alternate frequency band is not met (block 448—NO), the alternate frequency band may be utilized (block 452). For example, frequency band assigner 340 may assign a channel associated with the alternate frequency band as the frequency band channel to provide the service or the application invoked.

Referring to block 446 in FIG. 4D, it may be determined whether the frequency band biasing is met for the same frequency band (block 446). When it is determined that the frequency band biasing is not met (block 446—NO), the frequency band may remain the same (block 454). For example, frequency band assigner 340 of wireless station controller 125 may assign a channel of the same frequency band to which multiband user device 110 accessed wireless network 115 as the frequency band channel to provide the service or the application invoked.

When it is determined that the frequency band biasing is met (block 446—YES), an alternate frequency band may be considered (block 456). For example, as previously described, assume that an alternate frequency band (e.g., 1900 MHz) exists. FBBS 315 may consider the alternate frequency band. The processes associated with blocks, 456, 458, 460 and 462 would be analogous to those discussed with respect to blocks 444, 448, 450, and 452.

Although FIGS. 4A-4D illustrate an exemplary process 400, in other implementations, additional, fewer, and/or different operations than those described, may be performed. For example, depending on the number and/or type of service categories or the number of frequency bands available, process 400 may be different. Additionally, although a particular operation of process 400 is described as being performed by a device, such wireless station controller 125, in other implementations, a different device (e.g., wireless station 120) may perform the operation, or the particular operation may be performed in combination therewith.

The foregoing description of implementations provides illustration, but is not intended to be exhaustive or to limit the implementations to the precise form disclosed. Accordingly, modifications to the embodiments, implementations, etc., described herein may be possible.

The term "may" is used throughout this application and is intended to be interpreted, for example, as "having the potential to," "configured to," or "being able to," and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

In addition, while a series of blocks have been described with regard to the process illustrated in FIGS. 4A-4D, the order of the blocks may be modified in other implementations. Further, non-dependent blocks may be performed in parallel.

It will be apparent that the device(s) described herein may be implemented in many different forms of software or firmware in combination with hardware in the implementations illustrated in the figures. The actual software code (executable by hardware) or specialized control hardware used to implement these concepts does not limit the disclosure of the invention. Thus, the operation and behavior of a device(s) was described without reference to the specific software code—it being understood that software and control hardware can be designed to implement the concepts based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method comprising:
   receiving, by a network device, a request for a service or an application;
   determining, by the network device, a type of the service or the application; selecting, by the network device, a frequency band to provide the service or the application from among multiple frequency bands, wherein each frequency band of the multiple frequency bands is associated with a bias parameter that indicates a maximum usage of each frequency band for each type of service or application available, and wherein there are multiple types of services or applications available for each frequency band, and wherein the selecting of the frequency band, from among the multiple frequency bands, is based on the determined type of the service or the application and the bias parameter associated with each frequency band; and
   providing the service or the application on the selected frequency band.

2. The method of claim 1, wherein the determined type of the service or the application corresponds to a real-time service or application or a non-real-time service or application, wherein the maximum usage indicates a numerical portion of frequency resources allocated in each frequency band for each type of service or application available.

3. The method of claim 2, wherein the selecting is biased toward a lowest frequency band of the multiple frequency bands when the determined type corresponds to the real-time service or application.

4. The method of claim 2, wherein the selecting is biased toward a highest frequency band of the multiple frequency bands when the determined type corresponds to the non-real time service or application.

5. The method of claim 1, further comprising:
   determining for a channel of the frequency band, by the network device, whether a maximum usage of a biasing parameter, which pertains to the determined type of the service or the application, is met.

6. The method of claim 5, wherein the selecting comprises:
   selecting, by the network device, the channel of the frequency band when the maximum usage of the biasing parameter, pertaining to the determined type of the service or the application, is not met;
   selecting, by the network device, another channel of the frequency band, of the multiple frequency bands, when the maximum usage of the biasing parameter, pertaining to the determined type of the service or the application and associated with the channel of the frequency band, is met; and
   selecting, by the network device, an alternate frequency band, of the multiple frequency bands, having a different frequency as the frequency band, when each maximum usage of each biasing parameter, pertaining to the determined type of the service or the application and associated with each channel of the frequency band, is met.

7. The method of claim 1, wherein the request originates from a multiband user device, and wherein a maximum usage of a bias parameter, pertaining to the determined type of the service or the application associated with one or multiple frequency bands, is greater than another maximum usage of the bias parameter, pertaining to another type of service or application associated with the one or multiple frequency bands, wherein the other maximum usage is greater than zero.

8. The method of claim 1, further comprising:
   determining, by the network device, whether another network device is operating in a frequency band biasing mode in response to receiving the request, and wherein the selecting comprises:
   bias selecting the frequency band to provide the service or the application in response to determining that the other network device is operating in the frequency band biasing mode, and
   not bias selecting the frequency band to provide the service or the application in response to determining that the other network device is not operating in the frequency band biasing mode.

9. A network device comprising:
   one or more communication interfaces;
   one or more memories to store instructions; and
   one or more processors to execute the instructions stored in the one or more memories to:
   receive, via one of the one or more communication interfaces, a request for a service or an application;
   determine whether a frequency band biasing is activated;
   determine a type of the service or the application based on the request, in response to a determination that the frequency band biasing is activated; and
   select from among multiple frequency bands, a frequency band to provide the service or the application, wherein each frequency band of the multiple frequency bands is associated with a bias parameter that indicates a maximum usage of each frequency band for each type of service or application available, and wherein there are multiple types of services or applications available for each frequency band, and wherein to select the frequency band is based on the determined type of the service or the application and the bias parameter associated with each frequency band.

10. The network device of claim 9, wherein the determined type of the service or the application corresponds to a real-time service or application or a non-real-time service or application.

11. The network device of claim 10, wherein when selecting, the one or more processors execute the instructions to:
bias select toward a lowest frequency band of the multiple frequency bands when the determined type corresponds to the real-time service or application.

12. The network device of claim 10, wherein when selecting, the one or more processors execute the instructions to:
bias select toward a highest frequency band of the multiple frequency bands when the determined type corresponds to the non-real time service or application.

13. The network device of claim 9, wherein the bias parameter is a dynamic parameter.

14. The network device of claim 9, wherein when selecting, the one or more processors execute the instructions to:
determine whether a maximum usage parameter of a bias parameter, which pertains to a channel associated with the frequency band and the determined type of the service or the application, is met.

15. The network device of claim 14, wherein, when selecting, the one or more processors execute the instructions to:
select the channel of the frequency band, in response to a determination that the maximum usage of the biasing parameter, which pertains to the channel and the determined type of the service or the application, is not met; and
select another channel of the frequency band, in response to a determination that the maximum usage of the biasing parameter, which pertains to the channel and the determined type of the service or the application, is met.

16. The network device of claim 9, wherein the network device includes a radio network controller or a base station controller.

17. A non-transitory storage medium storing instructions executable by a processor of a computational device, which when executed cause the computational device to:
receive a request for a service or an application;
determine a type of the service or the application based on the request;
select a frequency band to provide the service or the application from among multiple frequency bands, wherein each frequency band of the multiple frequency bands is associated with a bias parameter that indicates a maximum usage of each frequency band for each type of service or application available, and wherein there are multiple types of services or applications available for each frequency band, and wherein to select the frequency band, from among the multiple frequency bands, is based on the determined type of the service or the application and the bias parameter associated with each frequency band; and
providing the service or the application on the selected frequency band.

18. The non-transitory storage medium of claim 17, the non-transitory storage medium further storing one or more instructions executable by the processor of the computational device, which when executed cause the computational device to:
determine for a channel of the frequency band, whether a maximum usage of a biasing parameter, which pertain to the determined type of the service or the application, is met.

19. The non-transitory storage medium of claim 17, wherein the determined type of the service or the application corresponds to a real-time service or application or a non-real-time service or application.

20. The non-transitory storage medium of claim 19, wherein the selecting is biased toward a lowest frequency band of the multiple frequency bands when the determined type corresponds to the real-time service or application.

* * * * *